US009341706B2

(12) United States Patent
Ward (10) Patent No.: US 9,341,706 B2
(45) Date of Patent: May 17, 2016

(54) RADAR SYSTEM

(75) Inventor: Keith Douglas Ward, Hayes (GB)

(73) Assignee: TMD Technologies Limited, Middlesex (GB)

( * ) Notice: Subject to any disclaimer, the term of this patent is extended or adjusted under 35 U.S.C. 154(b) by 415 days.

(21) Appl. No.: 13/879,364

(22) PCT Filed: Oct. 10, 2011

(86) PCT No.: PCT/GB2011/001462
§ 371 (c)(1),
(2), (4) Date: Jun. 28, 2013

(87) PCT Pub. No.: WO2012/049450
PCT Pub. Date: Apr. 19, 2012

(65) Prior Publication Data
US 2013/0285847 A1   Oct. 31, 2013

(30) Foreign Application Priority Data

Oct. 12, 2010 (GB) .................................. 1017210.4

(51) Int. Cl.
*G01S 7/292* (2006.01)
*G01S 7/41* (2006.01)
(Continued)

(52) U.S. Cl.
CPC ................. *G01S 7/41* (2013.01); *G01S 7/2813* (2013.01); *G01S 7/292* (2013.01); *G01S 7/412* (2013.01);
(Continued)

(58) Field of Classification Search
CPC ................... G01S 7/292–7/2927; G01S 7/41; G01S 7/411; G01S 7/412; G01S 7/414; G01S 7/415; G01S 13/52; G01S 13/5244; G01S 13/56

USPC .......................... 342/159–164, 175, 192, 195
See application file for complete search history.

(56) References Cited

U.S. PATENT DOCUMENTS 3,668,702 A * 6/1972 Jones .............................. 342/91
6,226,321 B1 * 5/2001 Michels et al. ............... 375/227
(Continued)

FOREIGN PATENT DOCUMENTS

WO   2006/108275   10/2006
WO   2009/144435    3/2009
(Continued)

OTHER PUBLICATIONS

Jackson C.A. et al: "Options for mitigtion of the effects of windfarms on radar systems", IEE Conference Publication, Institution of Electrical Engineers, London, GB, Oct. 15, 2007, pp. 1-6.
(Continued)

*Primary Examiner* — Peter Bythrow
(74) *Attorney, Agent, or Firm* — Lowenstein Sandler LLP (57) ABSTRACT

A component is disclosed for a radar system that comprises a main antenna operable to move azimuthally to sweep an area, a transmitter for transmitting pulses from the antenna and a receiver for receiving return signals. The component is operable to enable the radar system to detect a target in the presence of a wind turbine located in the area. The component comprises a plurality of auxiliary antennas and a processor for processing the return signals, the processor being operable to generate a signature of the wind turbine from return signals received by the main and auxiliary antennas in a training process, to generate model data of a target or to receive model data of the target from memory, and to test returned data for the presence of a target, and, if a target is detected, to generate data representing a detected target. A method of detecting the position of a target in the presence of a wind turbine using the radar system is also described.

21 Claims, 8 Drawing Sheets

(51) Int. Cl.
- *G01S 13/52* (2006.01)
- *G01S 7/28* (2006.01)
- *G01S 13/91* (2006.01)
- *H01Q 3/26* (2006.01)
- *H01Q 21/08* (2006.01)
- *G01S 13/524* (2006.01)

(52) U.S. Cl.
CPC ............... *G01S 7/414* (2013.01); *G01S 7/415* (2013.01); *G01S 13/91* (2013.01); *H01Q 3/267* (2013.01); *H01Q 3/2635* (2013.01); *H01Q 21/08* (2013.01); *G01S 13/52* (2013.01); *G01S 13/5244* (2013.01)

(56) References Cited

U.S. PATENT DOCUMENTS

| | | | | |
|---|---|---|---|---|
| 6,771,723 | B1* | 8/2004 | Davis et al. | 375/350 |
| 7,567,203 | B2* | 7/2009 | Dizaji et al. | 342/90 |
| 7,864,103 | B2* | 1/2011 | Weber et al. | 342/123 |
| 2007/0024494 | A1* | 2/2007 | Dizaji et al. | 342/90 |
| 2008/0111731 | A1* | 5/2008 | Hubbard et al. | 342/160 |
| 2009/0202347 | A1* | 8/2009 | Rugger | 416/31 |
| 2010/0265120 | A1* | 10/2010 | Drake et al. | 342/36 |
| 2010/0265122 | A1* | 10/2010 | Oswald | 342/136 |
| 2011/0181455 | A1* | 7/2011 | Vanuytven | 342/27 |
| 2011/0260908 | A1* | 10/2011 | New et al. | 342/59 |
| 2012/0056775 | A1* | 3/2012 | Weiss | 342/139 |
| 2012/0105272 | A1* | 5/2012 | Moruzzis et al. | 342/159 |
| 2012/0249361 | A1* | 10/2012 | Sahinoglu et al. | 342/159 |
| 2013/0127656 | A1* | 5/2013 | Webster et al. | 342/159 |

FOREIGN PATENT DOCUMENTS

| | | |
|---|---|---|
| WO | WO 2009144435 A1 * | 12/2009 |
| WO | 2010/037770 | 4/2010 |

OTHER PUBLICATIONS

International Search Report and Written Opinion of the International Searching Authority for International Patent Application No. PCT/GB2011/001462 mailed Jan. 19, 2012.

Search Report under Section 17 for United Kingdom Application No. GB1017210.4.

\* cited by examiner

Doppler versus time over 3 revolutions

$$R = \begin{bmatrix} \langle V_1 V_1^* \rangle & \cdots & \langle V_{48} V_1^* \rangle \\ \vdots & & \vdots \\ \langle V_1 V_{48}^* \rangle & \cdots & \langle V_{48} V_{48}^* \rangle \end{bmatrix}$$

RADAR SYSTEM

This invention relates to radar, and especially to the type of radar system that is employed for air traffic control in commercial airports and military air bases.

The purpose of a local air traffic control primary radar is to detect airborne targets, both cooperating and non-cooperating, in the vicinity of airports at all operational heights and at ranges up to about 70 nautical miles (about 130 km). Such radars invariably operate such that the frequency spread of the return signals are processed to determine whether there is evidence of a Doppler shift caused by radial movement of target returns. If there is no Doppler shift the returns are assumed to be from static clutter and can therefore be eliminated, while those with a significant Doppler return are assumed to be from an aircraft target and are passed through the filtering system, detected and output as radar plots. Such processing systems may be of varying degrees of sophistication and discrimination and are described by such names as Moving Target Indication (MTI), Moving Target Detection (MTD) or Pulse-Doppler. These arrangements, combined with the use of contour maps and clutter maps to filter the occasional excessive clutter returns which rise above the Doppler filters, have worked well until recently and it has been possible to distinguish between aircraft and background clutter with a high level of certainty.

Recently, however, in order to reduce the dependence on fossil fuels, it has become common to employ wind turbines as a source of power. Such wind turbines typically comprise a tower of up to 180 m in height supporting a nacelle and a rotor of up to 80 m diameter which is turned to be normal to the prevailing wind direction. Wind turbines may be present singly or in large arrays of up to 200 or more in wind farms. Such wind farms, if present in the region of an airport or air base, present a considerable challenge to the provision of air traffic control since they will have a radar cross-section (RCS) that is considerably greater than that of most of the targets it is necessary to detect. For example a static tower may have an RCS of about 100,000 $m^2$ and that of the blade may be approximately 1000 $m^2$ while the RCS of a large passenger aircraft is normally only 100 $m^2$ and that of a military jet may only be in the order of 1 $m^2$. In addition, the wind turbine may generate varying amounts of Doppler. For example, if the turbine is turned so that the radar antenna views the turbine in the plane of the rotor, rotor blades will be moving toward and away from the radar as the rotor rotates which will generate significant Doppler shift in the return signal from the turbine. In certain circumstances this may be manifested as a series of flashes of very high intensity in the radar return signals as different blades are instantaneously normal to the direction of the wind turbine from the radar antenna (generally when they are vertical).

The result of this is that the radar returns from a distributed wind farm are seen as a mass of clutter within which it is not possible to distinguish genuine targets from wind farm derived clutter. It may be possible to distinguish targets from the wind farm clutter if a phased array antenna were used, but such phased array antennas are prohibitively expensive for anything other than military applications. For example, a military phased array radar may cost in the order of £30 million, whereas an air traffic control radar may cost only £3 million or so. Most basic local air traffic control radars have only a single main beam, often supplemented with a secondary high level close range beam, so that the area occupied by the wind farm will "sterilise" returns from aircraft even when flying at heights well above the turbines.

Furthermore, although it has been proposed to mitigate the effects of the wind turbines by modifying the turbines themselves, this is often impractical since it may not be possible to gain access to the turbines. Indeed, they may even be located in a different country.

It is the intention of the present invention to provide a modification or upgrade for existing radars that is relatively inexpensive and can mitigate the interference caused by wind turbines or wind farms. Preferably the upgrade may be installed in virtually any air traffic control radar (typically radars of the type that do not have electronically steered beams) at an economic cost.

According to one aspect, the present invention provides a component for a radar system that comprises a main antenna that is operable to move azimuthally in order to sweep an area, a transmitter for transmitting pulses from the antenna and a receiver for receiving return signals, the component being operable to enable the radar system to detect a target in the presence of a wind turbine located in the area; the component comprising a plurality of auxiliary antennas and a processor for processing the return signals, the processor being operable to generate a signature of the wind turbine from a number of return signals received by the main antenna and the auxiliary antennas in a training process, to generate or receive model data of a target, to test returned data for the presence of a target using the signature and the model data, and, if a target is detected, to generate data representing the detected target.

The present invention also provides a radar system which comprises an antenna that is operable to move azimuthally in order to sweep an area, a transmitter for transmitting pulses from the antenna and a receiver for receiving return signals, and a component according to the first aspect of the invention comprising the auxiliary antennas and the processor. The invention may be referred to below as a radar system when describing various aspects thereof, but it will be appreciated that the invention will not necessarily be limited to including conventional features of radar systems such as the main antenna in all cases, and may simply mean a component as specified above that can be combined with a conventional radar system in order to upgrade it.

The component according to the invention has the advantage that the processing effectively arranges receive beam nulls to minimise or mask out the wind turbines as the main transmitting beam scans across the area while maximising the returns from genuine targets. The processing can be self-calibrating (that is to say, accurate positioning of the auxiliary antennas may be unnecessary) and can produce effective nulls in elevation and Doppler at the known ranges and azimuth angles of the wind turbines. The additional antennas can be simple dishes or flat printed antennas, which are cheap to manufacture in quantity and which can be remotely configured to suit the application. Although the auxiliary antennas will require additional receiver channels, this can easily be provided by the use of modern digital receivers.

The auxiliary antennas may either be capable of rotating with the main antenna or be fixed to point in the direction of the wind turbines.

According to the broadest aspect of the invention, a single auxiliary antenna has the disadvantage that a number of nulls may be present in the return signal so that the returns may be minimised at a number of different elevations. It is therefore preferred for a plurality of auxiliary antennas to be used in order to generate a number of overlapping lobes at different elevations so that a null is generated at a small number of elevations, preferably at only one elevation which corresponds to the elevation of the turbine(s). The component may include more than two auxiliary antennas if desired, and may have any number of auxiliary antennas, for example up to ten, but preferably no more than four fixed antennas since too many auxiliary antennas may generate too great a computational burden. The additional auxiliary antennas may be located on the structure provided for the antenna, either below or above the main antenna, and either fixed or rotating with the main antenna.

In one form of device and method to generate the null(s) in the return signals, the processor is operable to implement a detection filter matched to the target signal in a noise background characteristic of the wind turbine. The received radar signal during the detection test is defined as a vector $\alpha$, whose components are the complex amplitudes of the range cell under test for all pulses within the scanning beam dwell time (in the direction of the azimuth angle under test) from all the antennas. The test statistic for this data is given by $$\alpha R^{-1} s^*$$

where $\alpha$ is a vector defining the return signals under test;
$R^{-1}$ is the inverse of an estimate of the covariance matrix of the radar signal from a wind turbine; and
$s^*$ is the complex conjugate of the target signal vector to be detected.

A threshold h is applied to this test statistic for determining whether or not the return signal is to be regarded as containing a target.

An estimate of the covariance matrix of the wind turbine noise may be obtained from a signal vector V, which is the received radar signal from a wind turbine with the same components as $\alpha$ a above, as follows $$R=VV^H$$

where H denotes the Hermitian transpose. It is usual to average R over many examples of V to improve the accuracy of the estimate of R. Thus $$R=<VV^H>$$

where the brackets $<>$ denote an average.

The estimated covariance matrix R need not be generated for return signals over the entire set of range values that is generated in the return signals since this would require a very large computational burden. Instead it is possible, and preferred, for the processor to generate estimates only for those values of the returns that have delays that correspond to the distance from the radar antenna to the wind turbine or farm. Similarly it is not necessary to generate the covariance matrix for all azimuthal angles.

Thus, the processor may be operable to generate the covariance matrix R only for return signals corresponding to the range and the azimuthal angle of the or each wind turbine, and is preferably operable to generate the covariance matrix R for return signals corresponding to the range and the azimuthal angle of the wind turbines forming a wind farm.

In operation, the processor may generate an estimate of the covariance matrix from a running average of the outer product, $VV^H$, of the return signals, V, once operation of the radar system is initiated. This may be performed by generating the estimates for the wind turbines individually if possible. In such a case where the main antenna is a reflector antenna, the return vector V from each wind turbine would be sampled once for each complete revolution of the antenna and that sample may be added to the running average of the covariance matrix. However, such a procedure may have the disadvantage that if only a single sample is obtained from each turbine each revolution of the antenna, the process may take too long to generate a good estimate of the covariance matrix with sufficient samples for each value. In this case it may be preferred to take an average over the returns for a number of wind turbines in a wind farm, or alternatively to take an average over the returns from all the wind turbines in a wind farm.

Alternatively, it may be possible to sample returns from all the wind turbines in a training procedure for each orientation of the turbines and speed before the test session, and to put the covariance matrix estimate in a look-up table for use with later test conditions.

If the "flash" timing of the turbines can be predicted using transmissions from one of the auxiliary antennas it may be possible to generate two covariance matrices, one covariance matrix corresponding to an intense return signal from the wind turbine during a "flash" and another covariance matrix corresponding to a return signal in the absence of a "flash", and the processor is operable to generate a plurality of matched filters in dependence of whether or not a flash is observed. This procedure may improve performance by reducing the number of false alarms caused by the flashes.

According to another aspect, the invention provides a method of detecting the position of a target in the presence of a wind turbine or wind farm, which comprises transmitting radar pulses from a main antenna that moves azimuthally and processing return signals received by the main antenna and a plurality of auxiliary antennas, the method including the steps of: generating a signature of the wind turbine from a number of return signals received by the main and auxiliary antennas in a training process, generating model data of a target or receiving model data of a target from a memory, and testing the returned signals for the presence of an aircraft using the signature and the model data. The method preferably comprises the steps of:

(1) generating an estimate of the covariance matrix R of the return signals from wind turbines that are received by the antennas;
(2) generating a matched filter that is given by $$\alpha R^{-1} s^*$$

where $\alpha$ is a vector defining the return signals;
$R^{-1}$ is the inverse of the covariance matrix estimate; and
$s^*$ is the complex conjugate of the target signal to be detected;

(3) comparing the filter output with a threshold value; and
(4) determining whether or not a return signal is to be regarded as a target depending on the filter output value in comparison with the threshold value.

The invention also provides a carrier carrying a computer program comprising a plurality of computer-implementable instructions for causing a computer so programmed to perform the method of the invention.

One form of device and radar systems according to the present invention will now be described by way of example with reference to the accompanying drawings in which.

Figure 1:
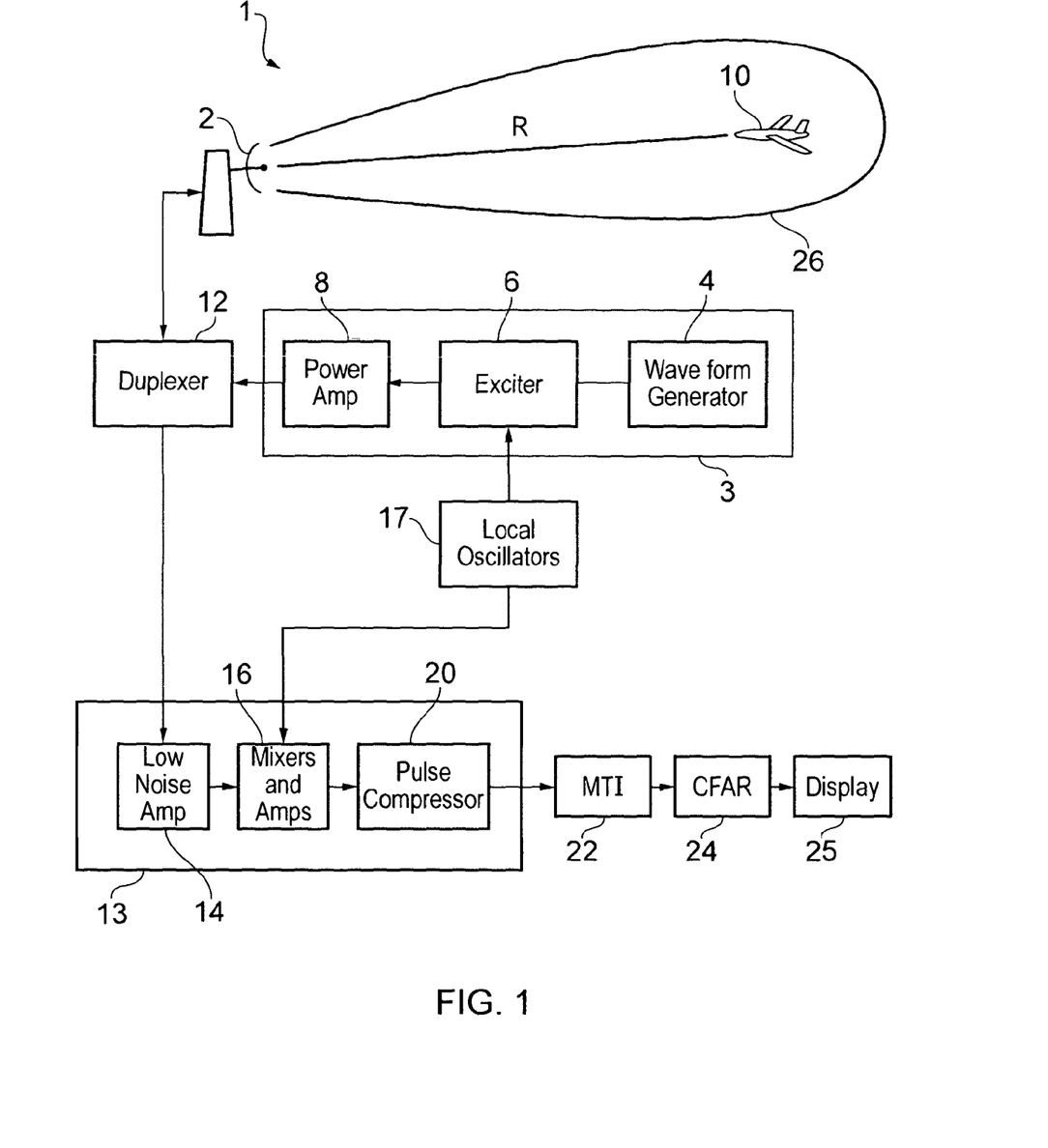
FIG. 1 is a schematic diagram showing a conventional radar system.

Referring to the accompanying drawings, FIG. 1 shows a typical form of radar system employed for air traffic control in the neighbourhood of an airport or military air base. Such a form of radar system 1 typically comprises an antenna 2 and electronic circuitry for generating and transmitting radar pulses, and for receiving, processing and displaying the pulses.

The antenna is typically a conventional parabolic reflector antenna in which the transmitted pulse is sent to a dish which transmits a signal in the form of a series of pulses and receives the signal after reflection by the target 10, in this case an aeroplane, and any other objects that are able to reflect it. The transmitted signal is normally in the form of a repetitive train of short pulses and is generated by a transmitter 3 comprising a waveform generator 4, an exciter 6 for mixing the generated waveform up to the radar frequency, and a power amplifier 8. The signal is then sent to the antenna 2 via a duplexer 12. After reflection of the signal by the target 10 the reflected signal, referred to as the returned signal or return, is received by the antenna and sent, via the duplexer 12, to a receiver 13 which has a low noise amplifier 14 as its first stage. The purpose of the duplexer is to permit the antenna to time share the signal for both transmission and reception and to protect the receiver from damage when the transmitter is on. After amplification of the returned signal by the amplifier 14, the signal is sent to a mixers and amps section 16, typically a superheterodyne receiver in which the signal is mixed in turn with the output of two local oscillators 17, following which the signal is processed by a pulse compressor 20, an MTI (moving target indication) canceller 22, CFAR (constant false alarm rate) threshold 24, and is displayed on a display 25, for example a plan position indicator (PPI) display that displays the range and angle of the detected plots.

By virtue of the construction of the antenna, the radar will exhibit maximum sensitivity to return signals of targets in a lobe 26 extending out from the antenna, with the result that the antenna will detect targets with varying sensitivity at any height from ground level to any given altitude and generate detected plots on the display 25.

Figure 2:
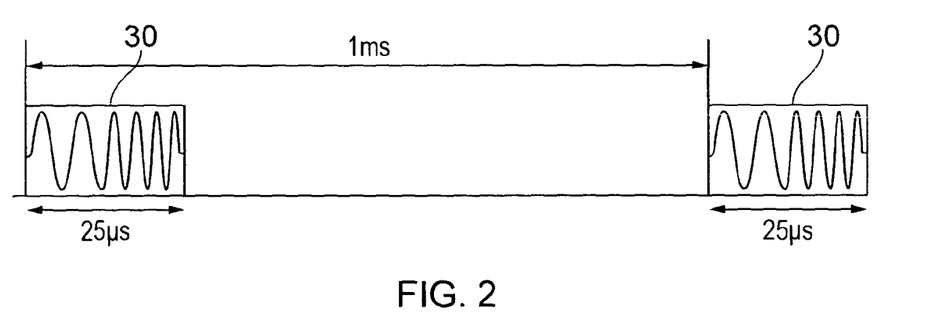
FIG. 2 shows the form of radar pulse employed by one form of radar.

FIG. 2 shows the general form of pulse that may be employed in one form of radar, although it will be appreciated that this is merely an example and that other pulses may be used. For a radar antenna that rotates at 4 seconds per revolution, and having a beam width of 1.5° (i.e. 1/240 revolution) which is typical of an air traffic control radar, the beam will have a dwell time on any location on the ground of about 16 ms. In order for the radar to have a maximum range of approximately 70 nautical miles (130 km) a pulse frequency (PRF) of approximately 1 kHz is set for the pulses, which gives an inter-pulse period of 1 ms. Two such pulses 30 are shown in FIG. 2. Each pulse is of typically 25 μs duration and may be a pseudo random sequence or a chirp of typically 2 MHz bandwidth for pulse compression techniques, followed by a further long period until the end of the time slot for the pulse during which the radar system is waiting for the return from the target. This time slot may vary from pulse to pulse, in order to allow detection of moving targets over a wide range of velocities. There may also be shorter pulses interleaved with the long pulses in order to be able to detect targets at a very short range when it would not be possible to detect them with the long pulse.

Figure 3:
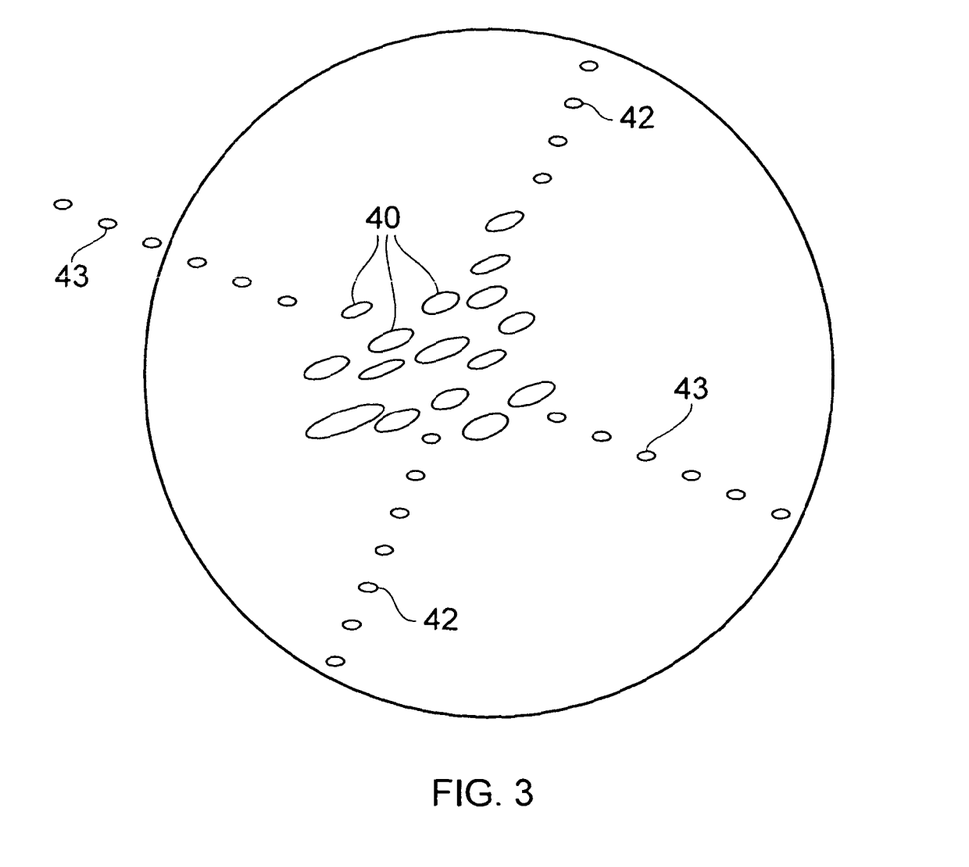
FIG. 3 shows a radar plot from such a radar system in the presence of a wind farm.

A typical radar plot as seen in a plan position indicator (PPI) display is shown in FIG. 3 for a radar system in the neighbourhood of a wind farm. In the centre of the indicator a large amount of clutter 40 can be seen which originates from the wind farm. In addition to the clutter a pair of tracks 42 and 43 can be seen from targets that are flying on courses that intersect one another in the region of the clutter. The traces of the targets are observed by lines formed by a number of returns at slightly different positions obtained for each revolution of the antenna. However, since a single return is observed for each target and for the wind turbines generating the clutter 40 irrespective of height of the targets and the wind turbines, the plots of the aircraft simply disappear into the general mass of clutter 40 to reappear once the aircraft have left the region of the wind farm. When the aircraft are in the region of the wind farm it is not possible to track them accurately.

Figure 4:
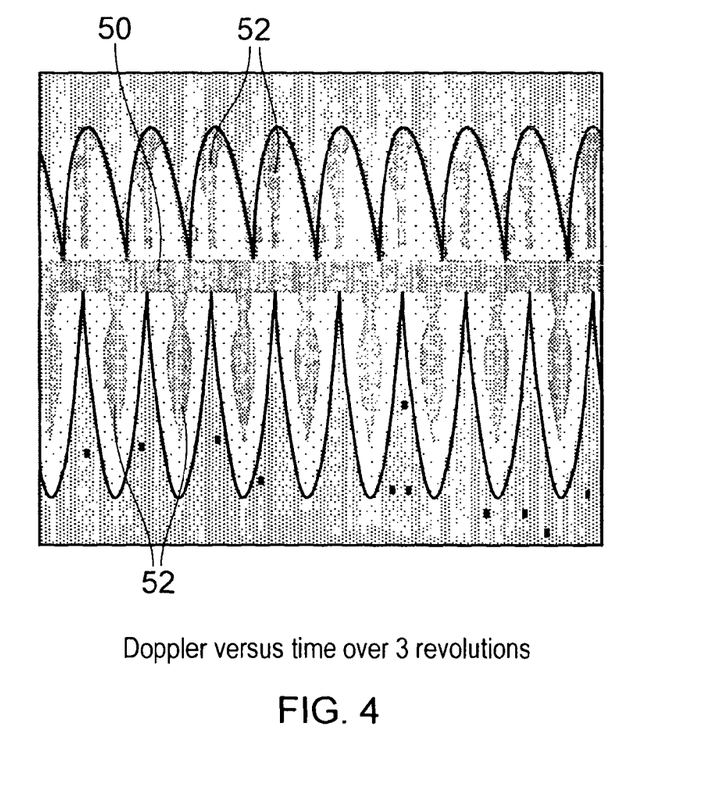
FIG. 4 shows schematically a number of flashes that can be caused by the radar reflecting from wind turbines.

The returns from the wind turbines will vary depending on a number of conditions, in particular on the orientation of turbine with respect to the antenna. For example, the tower of the turbine will generate a large static return while the blades will generate returns of varying sizes and Doppler shift. At one extreme, where the direction of the antenna is in alignment with the nacelle and therefore normal to the plane of the turbine blades, very little Doppler is present in the returns from the turbine, while if the turbine is oriented so that the direction of the antenna is perpendicular to the nacelle and thus in the plane of the turbine blades, the returns are as shown in FIG. 4 and form an intense signal 50 at zero Doppler shift caused by the mast or other parts of the wind turbine whose range does not change, and a series of "flashes" 52 appearing at six times the rate of rotation of the turbine blades (assuming three blades on each turbine) and having alternating positive and negative Doppler shifts. These flashes are caused by the reflections from the edge of the turbine blades as each blade is instantaneously moving toward (positive shift) or away from (negative shift) the antenna. Even in the case of an MTI radar system in which reflections from static objects such as the wind turbine towers that exhibit no Doppler are suppressed, a mass of clutter is observed that originates from the blades of the wind turbines and which can dwarf the returns from the targets.

Figure 5:
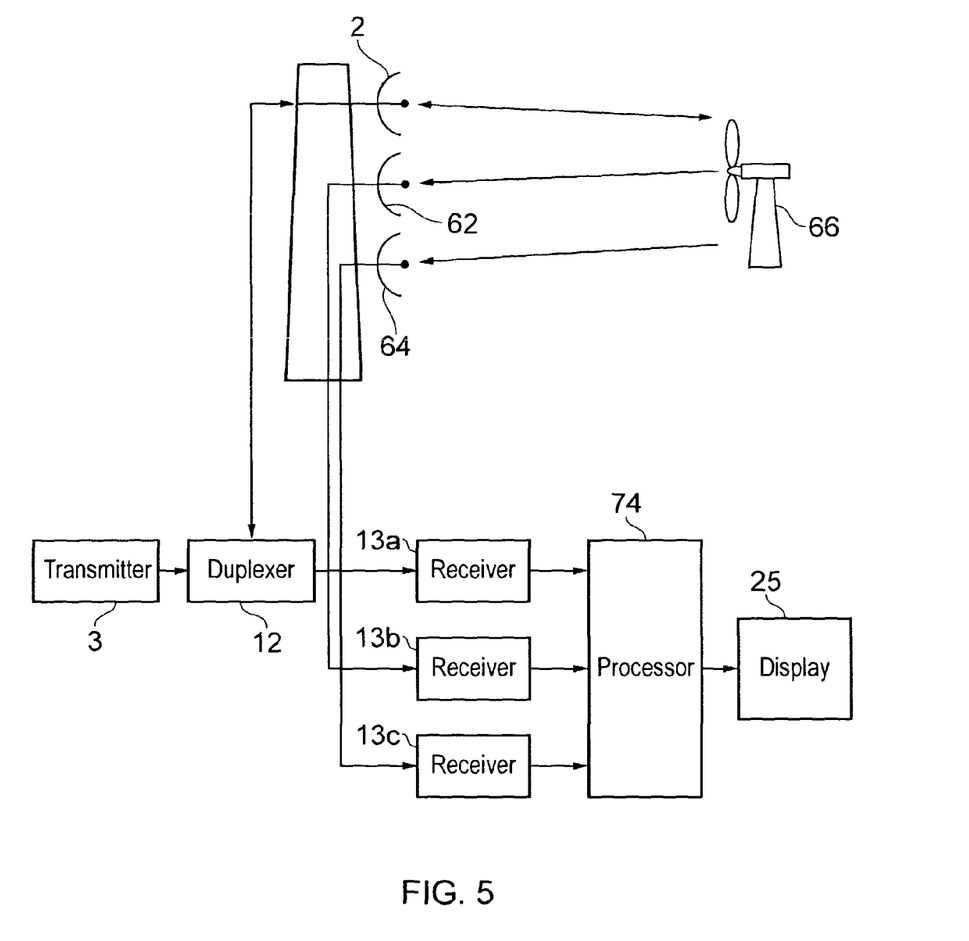
FIG. 5 shows schematically one form of radar system according to the present invention.

FIG. 5 shows schematically one form of radar system according to the invention. Items such as the waveform generator power amp and exciter forming the transmitter 3 have been removed for the sake of clarity, as have components of the receiver 13 such as the low noise amp 14, mixers and amp 16 and pulse compressor 20.

In the system shown in FIG. 5, the main antenna may be a conventional reflector antenna that is capable of transmitting pulses for example as shown in FIG. 2 and receiving returns and processing them to be displayed on a PPI display 25. The antenna will typically have a narrow beam width, for example from 0.5° to 2° and will rotate around a vertical axis in order to in order to obtain returns at all azimuthal angles around the antenna. In addition to the main antenna a number of auxiliary antennas 62 and 64 are present on the mast supporting the main antenna. These auxiliary antennas may be fixed and be directed toward a neighbouring wind farm represented by wind turbine 66. Alternatively, as indicated above, they may rotate with the main antenna and be synchronised with it or gated so that they only "see" the wind turbine or wind farm. Although the main antenna may have a relatively narrow beam width, the auxiliary antennas may have wider beams, for example having beam widths of from 4 to 16° and preferably from 6 to 12°. Typically the fixed auxiliary antennas have beam widths of about 8° so that each auxiliary antenna can see an entire wind farm rather than merely an individual turbine. Also, although two auxiliary antennas are shown in FIG. 5, it is possible in some cases to employ only a single auxiliary antenna, or to use more than two antennas if it is desired to improve the directionality of the antenna array formed by the main antenna 60 and the auxiliary antennas 62 and 64.

In operation, pulses are generated and are amplified by a transmitter 3 and sent to a duplexer 12 that allows pulses to be transmitted the main antenna 2 and received by all the antennas. The pulses are sent to antenna 2 whereupon they are transmitted into the aether, and returned signals are received by each of the antennas 2, 62 and 64. The returned signals from antenna 2 are sent to the duplexer 12 and then to a receiver 13a, corresponding to the receiver 13 shown in FIG. 1, which determines the complex amplitude (a complex number with the amplitude and phase of the received signal) at each range of each pulse return. The returned signals from antennas 62 and 64 are sent directly to receivers 13b and 13c respectively, where their complex amplitudes are determined. Receivers 13b and 13c also include a low noise amp 14, mixers and amps section 16 and pulse compressor 20. It is not necessary to send the returns from antennas 62 and via the duplexer 12 since these antennas do not transmit any pulses.

Figure 6:
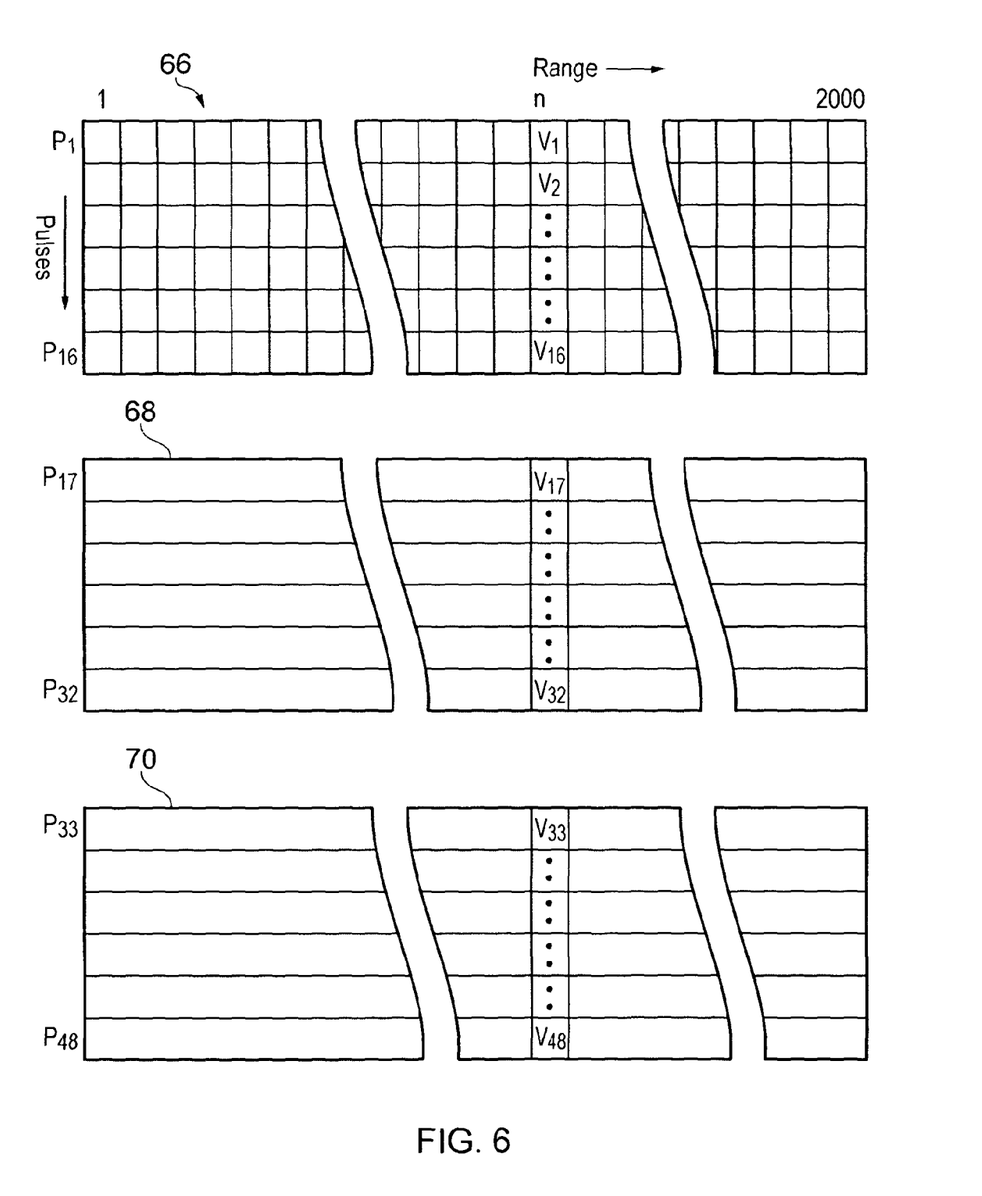
FIG. 6 is a schematic view of the output of a component and radar according to the present invention.

FIG. 6 shows the form of output from the three antennas 2, 62 and 64 after processing by the receivers. The output from receiver 13a forms a two dimensional matrix 66 having 32,000 elements (2000 by 16), for 2000 different delay values (corresponding to the 0.5 µs range bins of the receiver) for each of the 16 pulses that are sent during the dwell time of the main antenna over each azimuthal angle. Each element is a complex number $V_1$ to $V_{16}$ corresponding to the complex amplitude of the returned radar signal for the relevant pulse at each of the range bins. Only the complex amplitudes for the nth range bin corresponding to the range of a wind turbine or wind farm are labelled for the sake of clarity, but data for each range bin are recorded.

In addition to output matrix 66 originating from the main antenna, an output matrix 68 and 70 is generated from the returns from the auxiliary antennas and 64 respectively. The outputs from the auxiliary antennas are suppressed for all range values other than that corresponding to the range of the wind turbine or wind farm so that these two matrices are empty apart from their nth range bin.

The output from antenna 60 will, of course, be generated for each azimuthal angle of the antenna as it rotates through 360°. However, outputs are generated from the auxiliary antennas only for the azimuthal angles to which they are directed if they are fixed or for the time slot at which they are directed to the wind turbine or wind farm if they move together with the main antenna. The equipment that processes the returns will typically synchronise processing of the returns from the auxiliary antennas with processing from the main antenna so that the returns from the auxiliary antennas are processed only when the main antenna is directed toward the wind turbine or wind farm. The radar system thus has an azimuth gate that causes only those returns from the wind farm or wind turbine(s) to be corrected for the turbines, and returns from other azimuthal angles to be processed conventionally. The output from the main antenna 2 and each of the auxiliary antennas 62 and 64 are then passed to processor 74 for further processing. Although only a single processor is shown in the drawing and referred to herein, it will be appreciated that the processor may be provided by a number of separate processors which may be provided by hardware or software and which may include their own memory etc.

Figure 8:
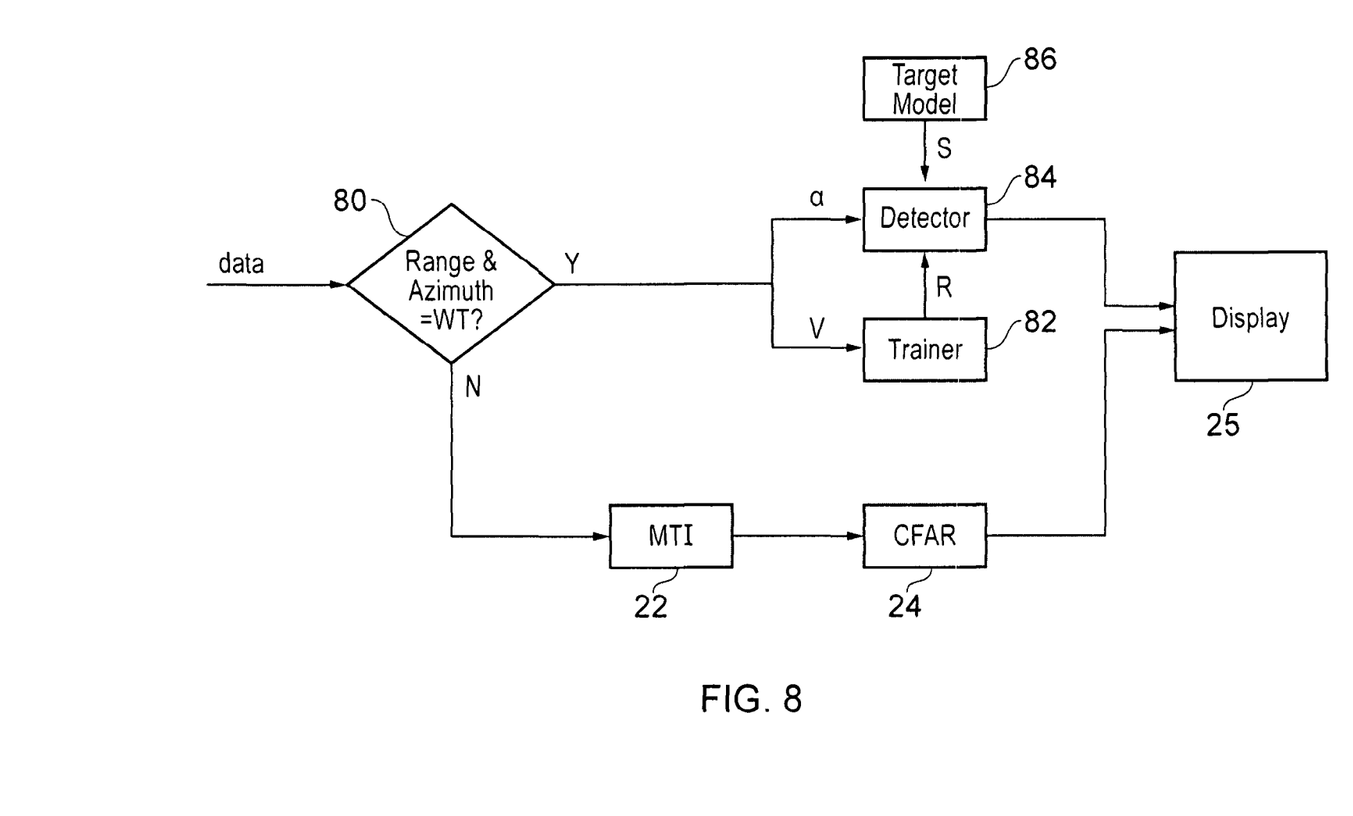
FIG. 8 is a schematic diagram showing the main process steps employed in the device according to the invention.

FIG. 8 shows schematically the operation of the processor 74. In FIG. 8 the data is shown as a single stream entering decision box 80 which may be obtained by combining the outputs from the receivers 13a to 13c as a single serial stream, or data from each of the receivers may be processed in parallel. At box 80 it is determined whether or not the range and azimuth of the incoming data correspond to a wind farm or wind turbine. If not, the data is processed conventionally by passing it to moving target indication (MTI) canceller unit 22, constant false alarm rate (CFAR) unit 24 and thence to the display 25.

Figure 7:
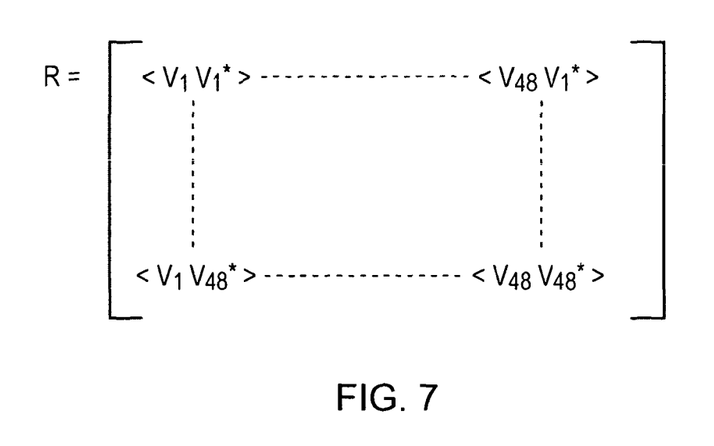
FIG. 7 shows a covariance matrix estimate formed from the output of the radar system shown in FIG. 6.

If the range and azimuth do correspond to a wind turbine or wind farm, the data forming the elements $V_i$ of the vector V of returns (where i takes the values of 1 to 16 for the main antenna 2, values 17 to 32 for auxiliary antenna 62, and values 33 to 48 for auxiliary antenna 64) is sent to a trainer unit 82. The trainer unit generates the cross-products of the elements of the vector V with their complex conjugates, $V_iV_j^*$ to form an estimate of the covariance matrix R during a training session. The cross-products are averaged over many examples of V to improve the accuracy of the estimate. This is shown in FIG. 7, where the brackets < > refer to the averaged values of the cross products. The many examples of V may be obtained from many wind turbines or from a single turbine on many antenna scans. Clearly the greater number of samples used to form the cross-products the greater the accuracy of the covariance matrix R will be. Preferably at least 10 and especially at least 100 samples are used, but the number of samples used to form the estimate of the covariance matrix should not be so great as to take more than 10 minutes and especially not more than 5 minutes. If significantly more samples are used, the time taken before test data can be obtained may be too great or the reflection from the wind turbines may change, for example due to a change in wind direction.

In addition to being sent to the trainer unit 82, the data forming the elements of the vector may be sent to a detector unit 84, during the test procedure (that is to say, when the radar is being used to detect aircraft). The complex amplitude data input from the receivers 13a to 13d during the test session is designated $\alpha_i$ rather than $V_i$. Detector unit 84 receives data forming the covariance matrix R from the trainer unit 82 and generates the inverse $R^{-1}$ by standard computational methods, although the inverse may obviously be generated by the trainer unit 82 rather than by the detector unit 84. The detector unit also receives a vector s forming a model return 86 of a target that it is wished to observe or its complex conjugate s*. The detector unit 84 then tests for the presence of a target by forming a value h which is given by:

$$h = \alpha R^{-1} s^*$$

Values of h above a designated threshold may be regarded as a genuine target. The output from the detector is then passed to the display 25 together with the data output from the MTI unit 22 and CFAR unit 24 for display by the display unit.

In this way, the processor unit 74 is operable to determine:
(i) if the detected azimuth is clear of known envelopes of all wind turbines; OR
(ii) if the detected range is clear of known envelopes of all wind turbines; OR
(iii) if the received data exceed the turbine matched filter detection threshold.

If any of these tests is true, the target is assumed to be real and a radar plot is generated.

The samples of the complex vector V employed to form the covariance matrix R are given from training data that may be obtained before the system is used or while the system is in operation, for example as a running average generated simultaneously with the test data. Although ideally the training data that is used to form the covariance matrix should not include any target data so that the values R and $R^{-1}$ are generated in the absence of target data, in practice the target data is insignificant compared with returns from the wind turbines so that a good estimate of the covariance matrix is obtained even when training data is obtained in the presence of targets. For this reason the training data may be obtained by generating a running average when the test data are obtained. Alternatively, the data could be obtained beforehand and the values be stored in a look-up table which may, for example, include values for the returns at each orientation and/or speed value of the wind turbine. If the covariance matrix is obtained from individual wind turbines, it may be necessary to run the system for a significant length of time in order to obtain sufficient training data since it may need one rotation of the main antenna in order to obtain training data for each wind turbine. However, if the auxiliary antennas are fixed and have a sufficiently wide beam width to observe the entire wind farm rather than an individual turbine, training data may be recorded for the entire wind farm on each sweep of the main antenna.

Although the auxiliary antennas will normally be entirely passive and will not be employed to transmit pulses, it is possible when they are not rotating to use them actively to mitigate the effect of large RCS flashes from the blades. If a low power transmitter is used to illuminate a wind turbine from one of the fixed auxiliary antennas and is synchronised with the rotation of the main antenna so that the wind turbine is illuminated only when the main antenna is directed elsewhere, the turbine reflections can be received by a different auxiliary fixed antenna and used to detect the high RCS flash sequence from each turbine. This data may be used to predict when the flashes will occur during the rotating antenna illumination time and adjust the processing accordingly. For example, the processing could be modified to estimate two covariance matrices, one in the presence of a flash and another in the absence of a flash. The threshold applied to h to identify a return as a target could be adjusted accordingly in order to reduce the rate of false alarms.

Other means of processing, different from a matched filter described above, may be applied to the signals from the main and auxiliary antennas to discriminate between the returns from a wind turbine alone and the combination of a wind turbine and an aircraft target. For example the covariance matrix estimate may be ill-conditioned and may require alternative processing to a straightforward inversion. All discrimination algorithms based on processing data from main and auxiliary antennas form part of this invention.

Additional processing techniques may be employed in combination with the processing conducted described above. For example a "track before detect" technique may be employed in which preliminary plots are detected and a preliminary tack is established. Verified plots are output only if they are compatible with the preliminary tack previously established and, if the target is lost for a scan within the null surrounding a wind turbine or wind farm, an estimated plot may be generated and output. Plots generated in this way preferably do not allow the system to exceed any specified false plot rate.

As described above, the processor unit 74 is operable to discriminate between aircraft and wind turbines using both the Doppler shift and elevation information contained within the returned signals simultaneously. However, it is possible for it to discriminate using the Doppler shift and elevation information sequentially. This may be achieved by using conventional MTI processors for the Doppler information in all of the receiver channels and then forming the covariance matrix of the output of the MTIs across all the antennas followed by a matched filter in elevation. This approach is likely to have inferior performance but be simpler to implement.

The component and radar according to the invention may be employed together with other, conventional, wind turbine mitigation methods, for example improved receiver dynamic range, reduced pulse compression side-lobes, improved moving target detection and CFAR (constant false alarm rate) thresholding in the standard processing channels, and advanced tracking techniques.

The invention claimed is:

1. A radar system operable to detect a target in an area in presence of a wind turbine located in the area, the radar system comprising:
   a main antenna operable to move azimuthally to sweep the area;
   a transmitter to transmit pulses from the main antenna;
   a receiver to receive return signals from the main antenna;
   a plurality of auxiliary antennas configured to capture reflected radiation transmitted by the main antenna and to generate return signals from the plurality of auxiliary antennas on the basis of the captured radiation; and
   a processor, operatively coupled to the receiver, to process the return signals, the processor being operable to:
     generate a signature of the wind turbine, in the form of a covariance matrix, from a number of return signals received by the main antenna and the plurality of auxiliary antennas in a training process;
     generate model vector data of the target in the area in the presence of the wind turbine or receive model vector data of the target from memory;
     test return signals from the main antenna and the plurality of auxiliary antennas for a presence of the target by forming a vector product based on the covariance matrix and the vector data and comparing the vector product to a threshold value; and
     detecting the target upon determining that the vector product exceeds the threshold value; and
     generate data representing the detected target.

2. A radar system as claimed in claim 1, wherein the processor is operable to implement a detection filter matched to a target signal, in a noise background characteristic of the wind turbine.

3. A radar system as claimed in claim 1, wherein the processor is operable to generate an estimate of the covariance matrix R of wind turbine noise from return signals from the wind turbine, where R is defined as:

$$R = \langle VV^H \rangle$$

in which
V is a complex amplitude of return signals from the wind turbine,
$V^H$ is a Hermitian conjugate of V and the brackets < > represent an average.

4. A radar system as claimed in claim 3, wherein the processor is operative to generate a value of:

$$\alpha R^{-1} s^*$$

where α is a vector defining the return signals under test;
$R^{-1}$ is an inverse of the estimate of a covariance matrix of a radar signal from the wind turbine; and
s* is a complex conjugate of model data of a target signal vector to be detected.

5. A radar system as claimed in claim 4, wherein the processor is operative to apply a threshold to a value $\alpha R^{-1} s^*$ to determine whether or not the return signal is to be regarded as containing a target.

6. A radar system as claimed in claim 3, wherein the processor is operable to generate the covariance matrix R only for return signals corresponding to a range and/or to an azimuthal angle of the wind turbine.

7. A radar system as claimed in claim 3, wherein the processor is operable to generate the covariance matrix from a running average of the return signals obtained in a test session.

8. A radar system as claimed in claim 3, wherein the processor is operable to generate the covariance matrix from an average of at least 10 samples of return signals.

9. A radar system as claimed in claim 3, wherein the processor is operable to generate the covariance matrix from a number of samples of return signals received over a period of up to 10 minutes.

10. A radar system as claimed claim 3, wherein the processor is operable to generate the covariance matrix from an average of return signals from each wind turbine separately.

11. A radar system as claimed in claim 3, wherein the processor is operable to generate the covariance matrix from an average of return signals from a plurality of wind turbines.

12. A radar system as claimed in claim 3, wherein the processor is operable to generate the covariance matrix from an average of return signals from all wind turbines in the vicinity of the radar system.

13. A radar system as claimed in claim 3, wherein the main antenna is a reflector antenna that is arranged to rotate through an entire revolution to sweep the area, and the processor is operable to sum values of the return signals obtained from each sweep to form the covariance matrix.

14. A radar system as claimed in claim 3, wherein the processor is operable to generate first and second covariance matrices, the first covariance matrix corresponding to an intense return signal from the wind turbine during a flash and the second covariance matrix corresponding to a return signal in an absence of a flash.

15. A radar system as claimed in claim 1, wherein each auxiliary antenna has a beam width that is greater than that of the main antenna.

16. A radar system as claimed in claim 15, wherein each auxiliary antenna has a beam width in a range of from 6 to 12°.

17. A method of detecting a position of a target in a presence of a wind turbine, the method comprising:
transmitting radar pulses from a main antenna that moves azimuthally and processing return signals received by the main antenna and a plurality of auxiliary antennas;
generating a signature of the wind turbine from a number of return signals received by the main and the plurality of auxiliary antennas in a training session;
generating model data of a target or receiving model data of a target from a memory; and
testing the returned signals for a presence of an aircraft using the signature and the model data.

18. A method as claimed in claim 17, which comprises the steps of:
generating an estimate of the covariance matrix R of the return signals from wind turbines that are received by the plurality of auxiliary antennas;
generating a matched filter that is given by
$$\alpha R^{-1} s^*$$
where
$\alpha$ is a vector defining the return signals;
$R^{-1}$ is an inverse of the estimate of the covariance matrix; and
$s^*$ is a complex conjugate of a target signal to be detected;
comparing an output value from the matched filter with a threshold value; and
determining whether or not a return signal is to be regarded as a target depending on the matched filter output value in comparison with the threshold value.

19. A method as claimed in claim 18, wherein the covariance matrix R is generated only for return signals corresponding to a range and/or an azimuthal angle of the wind turbine or group of wind turbines.

20. A method as claimed in claim 18, which includes illuminating the wind turbine by the main antenna or by one of the plurality of auxiliary antennas, and generating first and second covariance matrices, the first covariance matrix corresponding to an intense return signal from the wind turbine during a flash and the second covariance matrix corresponding to a return signal in an absence of the flash, and
generating a plurality of matched filters in dependence of whether or not the flash is observed.

21. A modification device of a radar system, the radar system comprising:
a main antenna operable to move azimuthally to sweep an area;
a transmitter to transmit pulses from the main antenna;
a receiver to receive return signals from the main antenna; and
a processor, operatively coupled to the receiver, to process the return signals; the modification device comprising:
a plurality of auxiliary antennas to capture reflected radiation transmitted by the main antenna and generating return signals on the basis of the captured radiation; and
wherein the processor is operable to:
generate a signature of the wind turbine, in the form of a covariance matrix, from a number of return signals received by the main antenna and the plurality of auxiliary antennas in a training process;
generate model vector data of a target or receive model vector data of the target from memory;
test return signals received by the main antenna and the plurality of auxiliary antennas for a presence of a target by forming a vector product based on the covariance matrix and the vector data and comparing the vector product to a threshold value;
detect the target upon determining that the vector product exceeds the threshold value; and
generate data representing a detected target.

* * * * *